United States Patent

Hugger et al.

[15] 3,645,660
[45] Feb. 29, 1972

[54] APPARATUS FOR JET AIR COOLING OF TIRES DURING POSTINFLATION

[72] Inventors: Richard H. Hugger, Ridgewood; George C. Huang, Kinnelon, both of N.J.

[73] Assignee: Uniroyal, Inc.

[22] Filed: May 21, 1969

[21] Appl. No.: 851,112

Related U.S. Application Data

[62] Division of Ser. No. 596,114, Nov. 22, 1966, abandoned.

[52] U.S. Cl. ................................. 425/445, 264/94, 425/28
[51] Int. Cl. ........................................................... B29h 5/02
[58] Field of Search ..................................................... 18/2 TP

[56] References Cited

UNITED STATES PATENTS

| | | | |
|---|---|---|---|
| 2,963,737 | 12/1960 | Soderquist | 18/2 TP |
| 3,008,180 | 11/1961 | Woodhall | 18/2 TP |
| 3,039,839 | 6/1962 | Waters et al. | 18/2 TP |
| 3,065,499 | 11/1962 | Brundage et al. | 18/2 TP |
| 3,170,187 | 2/1965 | Brundage | 18/2 TP |
| 3,343,208 | 9/1967 | Pacciarini et al. | 18/2 TP |

Primary Examiner—J. Howard Flint, Jr.
Attorney—Norbert P. Holler

[57] ABSTRACT

Various forms of apparatus for cooling pneumatic tires as they are removed from the press following the mold cycle and are subjected to a postinflation cycle outside the press, are disclosed. The basic apparatus includes means defining a cooling zone in which each tire being cooled may be axially received. The cooling zone is provided with orifice means arranged coextensively with its peripheral boundary to enable cooling air to be directed in jet form against the tire in its shoulder regions simultaneously along the entire circumference thereof, preferably so as to be incident initially directly against the shoulder regions of the tread. By proper choice of the blower means, the sizes, distribution and arrangement of the orifices, and the sizes and pressure drop characteristics of the duct system, the airflow conditions can be controlled to deliver a desired tire to air heat transfer coefficient ranging from about 15 to about 70 B.t.u./hr./sq. ft./° F. over the surface of the tire so as to ensure that, subject to appropriate adjustment of the duration of the jet air cooling relative to the duration of the in-mold heating, the finished tire is characterized by an optimized set of circumferentially substantially uniform thermal, physical and geometrical properties. This abstract is not to be taken either as a complete exposition or as a limitation of the present invention, however, the full nature and extent of the invention being discernible only by reference to and from the entire disclosure.

17 Claims, 15 Drawing Figures

APPARATUS FOR JET AIR COOLING OF TIRES DURING POSTINFLATION

This application is a division of Application Ser. No. 596,114, filed Nov. 22, 1966, now abandoned. This invention relates to improvements in the production of pneumatic tires and especially in the molding and the postinflation stages of the manufacture thereof.

For the tire industry, striving to meet quality standards for pneumatic tires which are becoming ever more stringent, the production of tires which are highly resistant to tread groove cracking and are also circumferentially uniformly dimensioned and cured is a matter of vital importance. To this end, pneumatic tires, immediately after being removed from the press or mold and while cooling down from the relatively high curing temperatures utilized in the press, are generally mounted on a suitable airtight rim or chuck structure and internally inflated by air to a pressure of about 30 to 50 p.s.i. or more, the maximum pressure in any given case basically depending on the size and type of the tire involved. This technique is universally known as "postinflation."

In actual practice, the tires on the postinflation equipment are almost invariably cooled by open air natural convection, resulting from their being exposed to the ambient atmosphere surrounding such equipment. Open air natural convection cooling has been found to be somewhat unsatisfactory, however, since not only is the rate of cooling relatively low due to the low heat transfer coefficient of stagnant or slow moving air, but it is also not uniform over all portions of each tire. This will be readily understood when it is considered that postinflation equipment is always located as near the tire curing presses as possible, whereby during postinflation the different parts of each tire (for example, the respective regions thereof facing toward and away from the press) will be exposed to different ambient temperatures, a condition which may be aggravated even further by such unpredictable factors as drafts in the curing room resulting from opening and closing of windows and doors, existing outside weather conditions, etc.

It is furthermore well known that tires continue to cure even after they have been removed from the press and while they are cooling down. It is then found, however, that a tire subjected to such nonuniform cooling rates is generally circumferentially nonuniformly cured at the locus of any given radial distance from the axis of the tire. A concomitant of this drawback has been the fact that such tires are also found to be characterized by radial dimensions which are circumferentially excessively nonuniform.

The foregoing considerations apply to all tires reinforced by carcasses composed of one or more plies of tire cord fabric, irrespective of the nature of the material of which the tire cords are made, i.e., whether such material develops substantially no or only negligible shrinkage stresses when subjected to high temperatures (such as cotton, rayon, glass fiber, steel wires, and the like) or whether it does develop appreciable shrinkage stresses under high temperatures (such as nylon, polyester, and the like). As to all such pneumatic tires, postinflation has provided great advances toward the elimination or minimization of tread groove cracking, inservice growth, and other related defects.

Tires made with standard nylon tire cord carcasses, apparently due to the thermoplastic characteristics of nylon, have nevertheless remained beset by the problem of "flat spotting," i.e., the tendency of such tires to develop flat spots when vehicles on which they are mounted are left standing for considerable periods of time. Since postinflation has not led to the elimination of this defect, attempts have been made to overcome the problem by the development and use of new tire cord materials. Merely by way of example, one such new material, a novel form of nylon recently developed by E. I. du Pont de Nemours & Co. and known generally as "nylon-44" or "N-44" nylon, gives promise that tires reinforced by carcasses made of this fiber may no longer be as seriously troubled by flat spotting, but tests have shown that nylon-44 carcass tires must be reduced by temperatures on the order of 140°–160° F. or less at the tread-carcass interface in order to reduce the cord shrinkage forces to an acceptable level and permit the post inflation operation to be terminated. In this connection, however, tests have also shown that generally in any batch of tires, regardless of the nature of the carcass, there will be a better yield of acceptable tires, i.e., tires not deviating more than a certain amount from preselected standards, when these tires are cooled to such relatively low temperatures while undergoing post inflation.

Although in theory the effectuation of such a temperature reduction offers no difficulties, in a practical tire manufacturing operation the need to wait for such a large temperature drop to take place is a disastrous disadvantage, due to the fact that under the standard open air convection cooling procedures, a tire must remain on the postinflation stand for a period of time roughly equivalent to from two to three or more full mold cycles to reach a temperature of about 160° F. In modern tire curing rooms, each press is generally associated with its own postinflation equipment, a dual unit press of any of the major types used by almost the entire industry thus requiring postinflation equipment able to accommodate the two tires cured during each operating or mold cycle of the press.

For standard dual (two-chuck) postinflation equipment, therefore, it is an absolute necessity for the tire to cool to the desired temperature in a period of time, i.e., a postinflation cycle, which is at most equal to and preferably somewhat shorter than a single mold cycle, so that the cooled tires can be removed from the postinflation equipment before the newly cured tires arrive there after being removed from the press. On the other hand, in certain types of recently developed quadruple postinflation equipment provided with two pairs of chucks able to accommodate four tires at a time, each pair of tires removed from the press can be permitted to stay on its pair of postinflation chucks for a period of time slightly less than two mold cycles in the press.

To the best of our knowledge, no postinflation equipment is presently in use which is capable of accepting three or more pairs of tires at a time so as to permit each tire to remain subjected to postinflation for a correspondingly greater number of mold cycles. In fact, space available in tire factories at the present time is already so limited that the use of such equipment (which would, of necessity, be extremely bulky) or even the provision of extra sets of the currently available types of postinflation equipment is a practical impossibility.

Various proposals have heretofore been made to accelerate the cooling of tires on postinflation equipment, i.e., to shorten the postinflation cycle, by subjecting such tires to the action of a moving cooling fluid. Representative of one class of these proposals are the techniques and equipment disclosed in Soderquist U.S. Pat. No. 2,963,737, Woodhall U.S. Pat. No. 3,008,180 and Brundage et. al. U.S. Pat. No. 3,065,499, all of which contemplate spraying water over each tire on the post inflation stand. While in theory the heat absorption capacity of water is sufficient to ensure that any tire subjected to a cold water spray would be cooled sufficiently within a period of time somewhat less than one full mold cycle, this method has not found any substantial acceptance in the tire industry principally for reasons of space and economy essentially similar to those which have militated against the simple expedient of increasing the quantity of available postinflation equipment, viz the problem of where to put the required bulky pumping mechanisms, liquid handling (supply and drainage) ducts, and related equipment for extracting from used water the heat imparted thereto by the tires being cooled, and the high cost of such systems. Water is also quite messy, and its use creates intolerable working conditions in the curing or press room.

On the other hand, it has also been proposed in Waters et. al. U.S. Pat. No. 3,039,839 to subject a cured tire on a postinflation stand to the action of a stream of room temperature air which would be blown against the tire by means of fans or with the aid of nozzles connected with a source of air under pressure. This approach too has not proved generally successful, even in the special case (to which that patent is primarily addressed) of tires reinforced by standard nylon-66 tire cord carcasses, in that it provides no assurance that a nonuniform cooling of different portions of the tire, as previously explained, can be avoided. In the case of tires reinforced by nylon-44 cord carcasses, this drawback is supplemented by the fact that the rate of heat transfer attainable by the Waters et. al. procedure is too low as well.

It is an important object of the present invention, therefore, to provide means enabling the problems and disadvantages heretofore encountered in the known methods of cooling pneumatic tires during postinflation to be substantially eliminated.

It is also an object of the present invention to provide means rendering the production of pneumatic tires more economical by enabling the respective full cure cycles of such tires, each consisting of a mold cycle and an immediately subsequent postinflation cycle, to be considerably shortened through a shortening of both parts of each cure cycle in such a manner that a major proportion of the desired cure state of the tire is achieved in the mold cycle and the remaining minor proportion in the postinflation or cooling cycle.

Yet another object of the present invention is the provision of novel apparatus for rapidly and in a precisely controlled uniform manner cooling tires made with carcasses of either heat-shrinkable or nonheat-shrinkable fiber tire cord materials during postinflation of such tires.

Generally speaking, as first disclosed in our aforesaid and copending application, during the mold cycle we heat each tire for a predetermined period of time which is less than the duration of a mold cycle required for effecting a full cure of that type of tire, thereby to impart to the tire during the so-shortened mold cycle a major proportion of the desired cure state to be attained in the entire cure cycle, whereupon during the immediately subsequent postinflation cycle we direct jet-like streams of cooling air, in predetermined flow patterns and at predetermined elevated volume flow rates sufficient to deliver a relatively high heat transfer coefficient on the order of from about 15 to 70 B.t.u./hr./sq. ft./° F., to be initially incident against selected regions of the tire, preferably the tread and shoulder regions which are normally the thickest and have the greatest heat-retaining capacity. The airflow conditions are furthermore so chosen that the heat transfer coefficient is automatically adapted to the varying thicknesses of different sections of the tire, specifically to be higher at the thicker sections than at the thinner ones. The term "heat transfer coefficient" as used herein will be more explicitly defined presently.

To this end, the apparatus according to the present invention includes means to define a cooling zone where a tire to be cooled after being removed from the press may be received while mounted on postinflation equipment, and orifice means arranged coextensively with the peripheral boundary of the cooling zone to enable the cooling air to be formed into the desired jetstreams and appropriately directed against a tire when the same is located in the cooling zone. The required airflow conditions are controlled by a proper choice of the blowers, the sizes and characteristics of the duct system and the cooling zone, and the sizes, distribution and arrangement of the orifices in the cooling zone.

The cooling air may be taken directly from the curing room atmosphere or, alternatively, may be taken from the outside of the building, and it may be either at the ambient temperature, generally between about 70 and 120° F. in the curing room and possibly somewhat lower outside, or it may be preliminarily cooled or refrigerated to any desired lower temperature. The volume flow rate of the air may range from about 500 to 1,000 cubic feet per minute in the case of most passenger tires, but if necessary, for example in the case of larger tires, correspondingly higher volume flow rates, ranging up to as much as 5,000 cubic feet per minute or more, may be employed. The tire when thus treated is cooled from its curing temperature to a temperature in the range of 140–160° F. at the tread-carcass interface in the shortest possible time and specifically in less than one full mold cycle.

With respect to nylon-44, actual tests have shown that treated, twisted and solutioned 1260/2 cords of this material having an average preheat tension of about 0.070 to 0.10 lb., develop a shrinkage tension at constant length of about 1.55 lbs./cord when heated to a temperature of about 350° F., which is reduced to about 0.3 lb./cord upon cooling to 160° F. and to about 0.2 lb./cord upon cooling to 150° F. The beneficial effect which a major total cord stress reduction can bring about thus will be readily understood when it is considered that there are generally about 20 cord ends per inch width in each fabric ply of the carcass. The controlled jet air cooling method of the present invention not only achieves this result in an extremely short period of time, as previously stated, but also in such a manner that both the stress reduction and the final cure state and dimensional stability are as uniform as possible throughout the circumference of the tire being cooled.

The foregoing and other objects, characteristics and advantages of the present invention will be more fully understood from the following detailed description thereof when read in conjunction with the accompanying drawings, in which.

Referring now first to FIGS. 1 to 4, the jet air cooling apparatus 20 according to our invention there shown is designed for use in conjunction with postinflation equipment 21 of the type in which the tire-receiving chuck or rim structure 22 is supported at one end of an arm 23 the other end of which is connected at 23a to a support 24 for pivotal swinging movement in a vertical plane. The arm 23 is provided with a longitudinal duct 25 establishing communication between a tire 22a (FIG. 4) in the chuck 22 and a hose 26 to enable air under pressure to be admitted into a tire T, when the latter is mounted on the chuck, so as to inflate the tire. Intermediate its ends, the arm 23 is articulated at 27 to the free end of a piston rod 28 of a suitable double-acting fluid pressure cylinder 29 the blind end of which is pivotally connected at 29a to a support 30. In this manner, the postinflation equipment 21 may be moved reciprocally between the positions thereof illustrated in FIGS. 1 and 3.

The jet air cooling apparatus 20 designed, according to this aspect of the present invention, to be used with the postinflation equipment 21, comprises a pair of cooling chamber-defining members 31 and 32. These members are substantially identical in construction and are arranged in mirror image relation to one another, being provided at their facing sides with semicylindrical recesses C' and C'' (FIG. 1) which, when the members 31 and 32 are in closed end to end juxtaposition (FIG. 3), define a cylindrical chamber C to accommodate the tire T being cooled. Merely by way of example, the member 31 is stationarily supported in any suitable manner (not shown) by framework 33, while the member 32 is movably supported by the framework 33 through the intermediary of a link 34 pivotally connected at 34a to the member 32 and at 34b to a bracket 33a of the framework 33. A cable 35 is connected to the member 32 to enable the latter to be raised away from or lowered toward the member 31.

As clearly shown in FIGS. 1 to 4, the curved boundary of the recess or chamber section C' of member 31 is defined by a semicylindrical wall 36 which also constitutes the curved boundary of an essentially U-shaped plenum chamber 37 the opposite boundary of which is constituted by a transverse flat wall 38. In the illustrated form of the invention, the wall 36 is shown as being provided with two pairs of parallel rows of small orifices 39 extending from one end of the wall 36 to the other, and the wall 38 is provided throughout its entire expanse with a plurality of openings 40 (FIGS. 3 and 4) preferably arranged in staggered parallel rows.

The member 31 is further provided with a chamber 41 coextensive with the wall 38. The chamber 41, which is shown as being essentially wedge shaped, communicates through a duct 42 with one branch 43a of the discharge side of a suitable blower 43 mounted on a bracket 33b of the framework 33. The intake side of the blower 43 is arranged to draw air from any suitable source, preferably the atmosphere in the tire curing room in which the apparatus 20 is located. The arrangement thus is such that air entering the chamber 41 from the duct 42 is distributed over the wall 38 so as to reach a uniform static pressure by virtue of the physical parameters of the chamber 41 and thence enters the plenum chamber 37 in a uniform manner, from which it passes at likewise uniform volume flow rates through the openings 39 into the recess C'.

In identical fashion, the recess C'' of the member 32 is bounded by a semicylindrically curved wall 44 which is provided with four rows of orifices 45 and also constitutes the curved boundary of a U-shaped plenum chamber 46 the opposite boundary of which is defined by a flat wall 47 provided with a plurality of openings 48 over its entire expanse. Through the openings 48, the chamber 46 communicates with a wedge-shaped chamber 49 which in turn communicates with a flexible duct 50 connected to a second branch 43b of the discharge side of the blower 43. It will be apparent from FIG. 4 that the respective sets of orifices 39 and 45 are so arranged that when the members 31 and 32 are closed to define the cooling chamber C (FIG. 3), the orifices are disposed in four continuous rows extending circumferentially about the chamber C at transversely spaced locations. Preferably, the spacing of the pairs of rows of orifices corresponds to the average distance between the shoulder regions of the tires in the range of nominal sizes to be treated in the apparatus 20.

Figure 1:
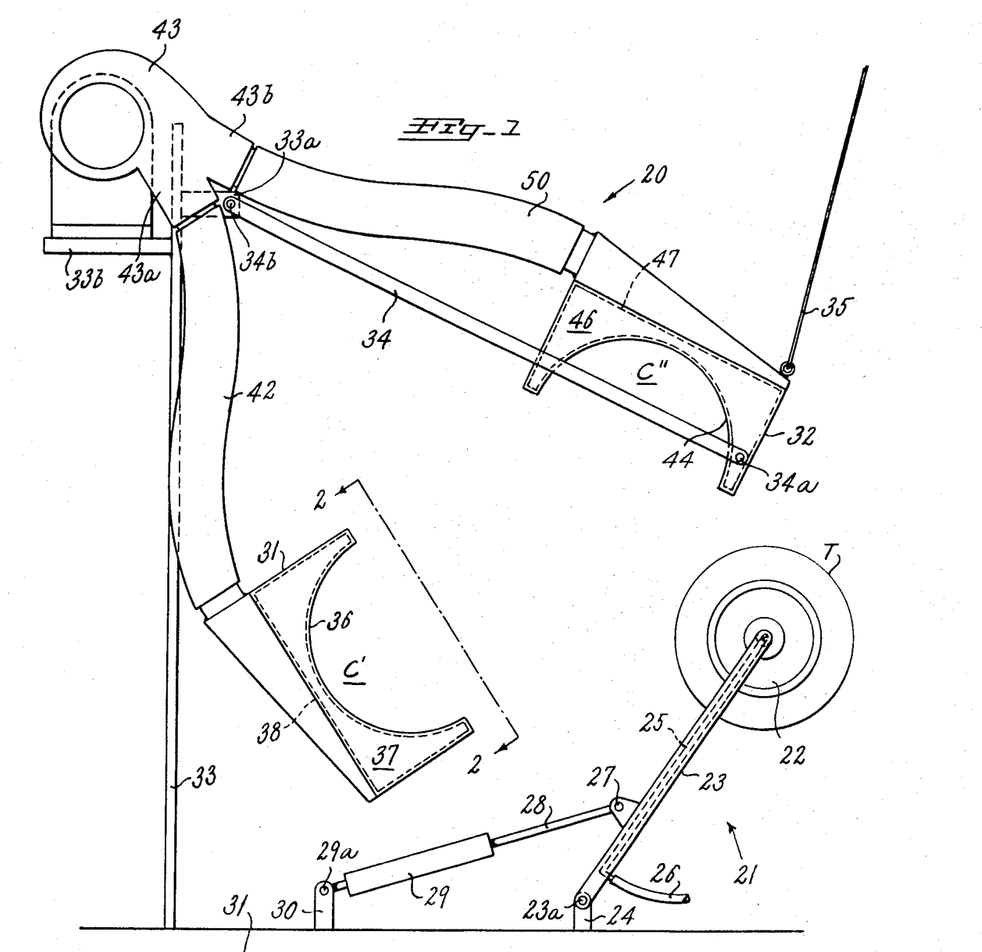
FIG. 1 is a fragmentary side elevational view of a jet air cooling apparatus constructed in accordance with one aspect of the basic principles of the present invention and adapted for use in conjunction with one type of postinflation equipment.
Figure 2:
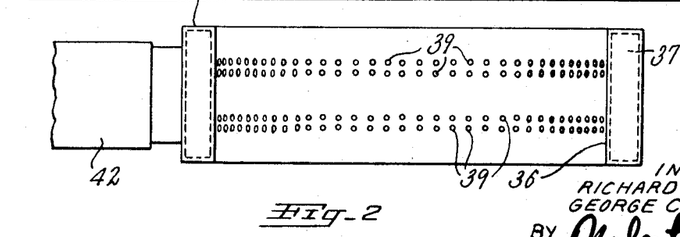
FIG. 2 is a fragmentary plan view of a part of the cooling apparatus shown in FIG. 1, the view being taken along the line 2—2 in FIG. 1.
Figure 3:
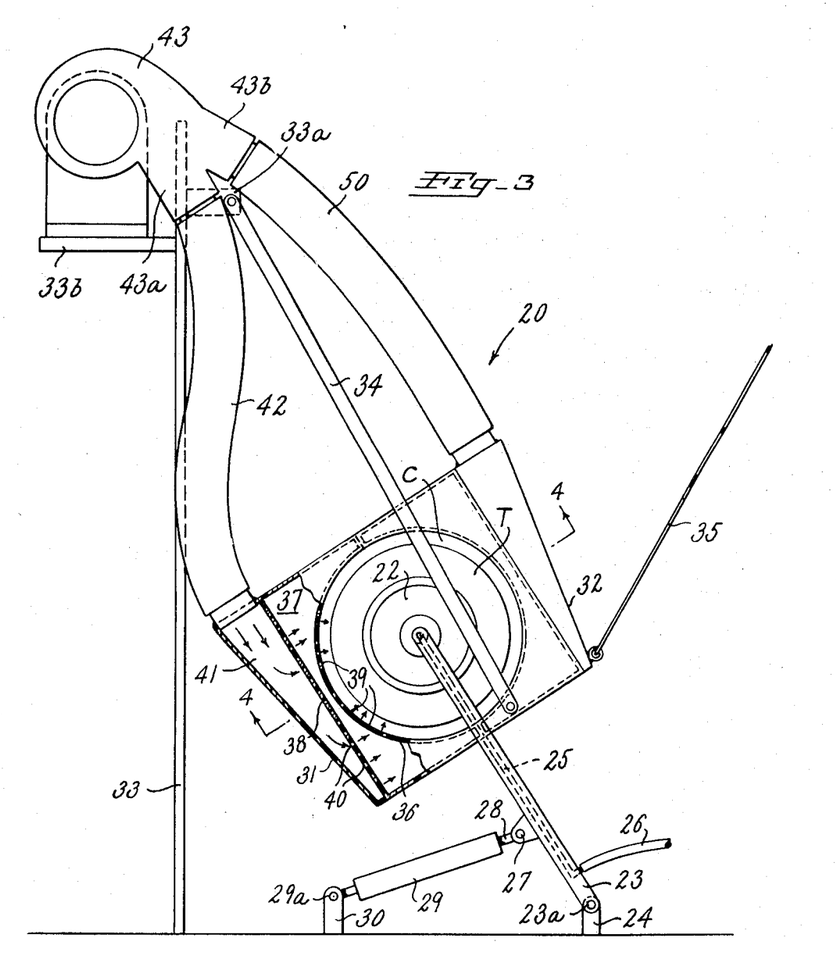
FIG. 3 is a fragmentary side elevational view, partly in section, of the jet air cooling apparatus and postinflation equipment shown in FIG. 1 when activated for a tire-cooling operation.
Figure 4:
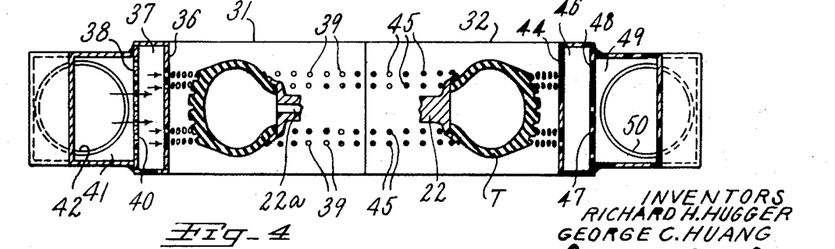
FIG. 4 is a sectional view taken along the line 4—4 in FIG. 3.

In operation, as soon as a tire T is removed from the press (not shown), mounted on the chuck or rim 22 of the postinflation stand 21 and inflated with air to a suitable internal pressure via the conduits 26-25-22a, the cylinder 29 is actuated to retract the piston rod 28, thereby to swing the arm 23 from its position shown in FIG. 1 to its position shown in FIG. 3, until one-half of the tire is disposed within the confines of the semicircular recess C' defined by the wall 36 of the member 31. The member 32 is now lowered through the cable 35 into the position shown in FIG. 3, so that the tire T is fully confined within the cooling zone defined by the cylindrical chamber C. With the blower 43 working, the cooling air, which in the illustrated preferred case is at the curing room temperature, normally on the order of about 100 to 110° F. (although it may be somewhat higher or lower), enters the chambers 41 and 49 and thence, due to the shape of these chambers and the provision of the perforated distribution walls 38 and 47, enters the respective plenum chambers 37 and 46, i.e., the distribution zone defined by these chambers, at a uniform static pressure. From the chambers 37 and 46, this air flows uniformly at a relatively high volume flow rate through the orifices 39 and 45 (see FIG. 4) against the tread of the tire T, playing principally against the shoulder regions of the tire (which are usually the thickest and thus the most heat retentive) and thence in part over the crown center region and in part over the sidewalls of the tire, the spent air leaving the cooling chamber via the open sides thereof. The details of the operating conditions employed to ensure that this arrangement enables the tire T to be cooled from the curing temperature to a temperature of about 140–160°F. at the tread-carcass interface at a period of time which is shorter than the duration of a normal full cure mold cycle for that type of tire will be more fully explained hereinafter in conjunction with the description of the process aspects of the present invention.

As previously indicated, although the use of the air in the curing room is preferred, it would be possible to use air piped in from the outside or from a suitable precooling or refrigerating device. A central air distribution system may be utilized as the air source, if desired. In any event, the basic requirement is that the air temperature be lower than the temperature to which the tire is to be cooled. For reasons which will presently become clear, the time of exposure of the tire to the cooling airflow may have to be adjusted in dependence on the air temperature.

In accordance with another aspect of the present invention (see FIG. 5), the jet air cooling apparatus 20 may be modified somewhat through the use of a pair of cooling chamber-defining members 51 (only one is shown) in lieu of the members 31 and 32 shown in FIGS. 1 to 4. Each such member 51 differs from either of the members 31 and 32 in that the semicylindrical wall 52 (which corresponds to the walls 36 and 44) is provided at its opposite sides with a pair of generally radially inwardly and axially outwardly extending wall portions 53 and 54. The cooling chamber section defined by the member 51 thus is somewhat trough shaped (rather than semicylindrical as are the chamber sections C' and C'). An internal plenum chamber 55 in the member 51 is bounded at the front by the wall 52-53-54, and, like the chambers 37 and 46, is bounded at the rear by a distribution wall (not shown) perforated over its entire expanse, behind which there is provided a pressure-equalizing chamber (like the chambers 41 and 49) into which the cooling air may be fed via a conduit such as 42 or 50.

Figure 5:
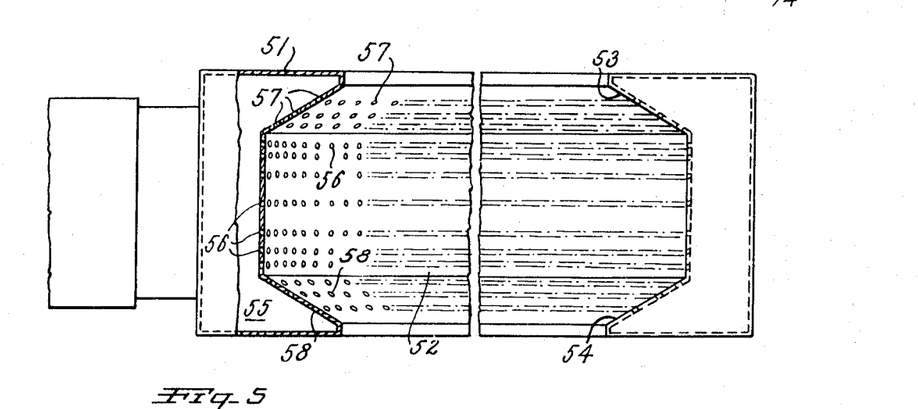
FIG. 5 is a fragmentary, partly sectional, plan view, similar to FIG. 2, of a part of a jet air cooling apparatus having a somewhat modified construction according to the present invention.

The wall portions 52, 53 and 54 in the illustrated form are all provided with respective sets of parallel rows of orifices 56, 57 and 58 establishing communication between the plenum chamber 55 and the cooling chamber section bounded by the wall 52-53-54. In FIG. 5, each of the wall portions 53 and 54 is shown as being provided with three rows of such orifices, while the wall portion 52 is shown as being provided with seven such rows, i.e., two pairs of rows juxtaposed to the general locations of the shoulders of a tire to be cooled, one central row juxtaposed to the crown center of such tire, and two rows each intermediate the central row and a respective one of the pairs of "shoulder" rows. It will be understood, of course, that the number of such rows of orifices in any of the wall portions 52, 53 and 54 of the member 51 may be varied, even to the point of complete elimination of one or more rows, as desired or found necessary. In practice, therefore, the cooling chamber defined by two members 51 when the same are in the closed position will be provided with circular rows of orifices arranged to direct cooling air not only against the tread of a tire received in said cooling chamber, but also against portions of the sidewalls of the tire, which may be advantageous, for example, in the case of relatively large size tires having considerable masses of usually highly heat-retaining rubber extending from the tread and shoulder regions radially inwardly along the sidewalls.

As will be readily understood, the postinflation equipment 21 may include two chucks 22 substantially identically arranged to cooperate with a dual cavity press, and the jet air cooling apparatus correspondingly may include two cooling chamber arrangements 31-32 or 51.

Although the jet air cooling apparatus so far described is of relatively simple construction, it is believed that it does fully bring forth not only the basic principles underlying the cooling aspects of the present invention but also the structural and operational features, parameters and relationships which will characterize any apparatus designed for this purpose. Thus, one of the foundations of our invention is the recognition that even unrefrigerated air at the temperatures normally reigning in tire curing rooms, generally between about 70 and 120° F., will, if caused to flow at an appropriate rate as more fully described hereinafter, deliver a heat transfer coefficient which is sufficiently high to enable the required high heat transfer rate from a tire under postinflation to be achieved with a degree of efficiency closely approximating that of a cold water spray and many times that of ordinary convection air cooling. The term "heat transfer coefficient" expressed in B.t.u./hr./sq. ft./° F. (where the last two terms refer, respectively, to the surface area of the tire being cooled and the difference in temperature between the surface and the cooling air) is here used to describe the effectiveness of the entire system the parameters of which include the temperature, velocity and direction of the airflow as well as the volume or mass rate of airflow, which in turn are functions of such parameters as orifice design and size, percentage of open area, the cooling chamber size, and the gap between the orifices and the tire surface. Basically, the higher the volume rate of flow and the velocity of flow, the higher is the heat transfer coefficient. Concomitantly, another foundation of our invention is the recognition that the potential value of even such an airflow in effecting a uniform rapid cooling of a tire under postinflation, to the end of imparting thereto circumferentially uniform cure states, cord stress conditions and dimensional stability, will be lost if the direction, localization and distribution of the airflow are not accurately defined to take into account the fact that the distribution of the heat transfer coefficient over the tire surface must be coordinated with the thicknesses of the different tire sections, to be higher at the thicker sections than at the thinner ones.

On the basis of these considerations, we have determined that a jet air cooling apparatus according to our invention preferably should have the following characteristics:

1. The air blower (i.e., 43 or its equivalent), which may be driven by a one to six-horsepower motor, should deliver the cooling air in the desired temperature range at a static pressure of up to about seven inches of water.
2. The air distribution plate (i.e., 38 or 47 or the equivalent thereof) may be about ⅛ and at most about ½-inch thick and perforated with holes between about ¼ and ¾-inch in diameter, spaced about ⅝ inch apart, and providing between about 10 to 50 percent open area, and its design in cooperation with the design of the pressure equalizing region (i.e., chamber 41 or 49 or the equivalent thereof) should be such as to develop a uniform static air pressure in the distribution zone (chamber 37 or 46 or the equivalent thereof) between about 1-½ and 5-½ inches of water. It will be understood that the plate thickness is not a critical parameter and need only be sufficient to provide the strength required for fabrication and to resist the fluid forces due to the airflow.
3. The cooling chamber boundary or air jet locus (i.e., wall 36-44 or the equivalent thereof) should be at most about ⅜-inch thick and perforated with holes between about ⅛ and ⅜-inch in diameter providing between about 1-¼ and 15 percent open area and enabling delivery, at a static pressure between about 1 and 4 inches of water, of a heat transfer coefficient between about 15 or 70 B.t.u./hr./sq. ft./° F., which we have determined requires a volume flow rate of between about 500 and 5,000 or more cubic feet per minute, and the diameter of the chamber should be such as to locate the air jets (i.e., the holes or openings 39-45 or equivalents thereof) between about ½ and 5 inches from the tire surface, thereby to enable each given chamber to be used in cooling tires of a range of sizes. It should be understood that the orifices may be in the form of round holes as stated or in the form of slots, nozzles, etc.
4. The jet air cooling apparatus should be adapted to the particular types of postinflation equipment available. Thus, it may be designed in either sectional or unitary form for cooling tires oriented either in a substantially vertical plane or in a substantially horizontal plane or in an inclined plane, it may be arranged for rectilinear or arcuate movement axially or radially relative to the tires, or it may be stationary for cooperation with movable postinflation equipment, etc., or both may be movable.

As an example of the operation of the cooling process of our invention, in actual production runs utilizing a four-row ¼-inch orifice arrangement apparatus of the type shown in FIGS. 1 to 4, with adjacent orifices at ¾-inch center to center spacings and the outside rows five inches apart, we have found that in the case of a 7.00×13/2 nylon tire cured in a "Bag-O-Matic" press with a 215 lb. steam cure, an external mold temperature of 324° F. and a total mold cycle of 13.5 minutes, jet air cooling during the postinflation cycle, with a pressure of three inches of water at the cooling chamber and a delivered volume flow rate of 723 cubic feet per minute of air at 110° F., reduced the tread-carcass interface temperature to 160° F. at the crown center of the tire in about nine minutes and at the relatively thicker shoulders in about 12.2 minutes. In the case of an 8.25×14/2 nylon tire cured under identical conditions with a 16.4 minutes mold cycle, the same jet air cooling during postinflation reduced the tread-carcass interface temperature to 160° F. at the crown center in about 10.3 minutes and at the shoulders in about 14.3 minutes.

Merely by way of illustration of the jet air cooling of tires on other types of postinflation equipment, in the copending application of R. H. Hugger and R. J. Brown, Ser. No. 140,602, filed May 5, 1971, which is a continuation of Application Ser. No. 822,746, filed May 7, 1969 and now abandoned, which in turn is a continuation of Application Ser. No. 596,122, now abandoned but filed of even date with the aforesaid Application Ser. No. 596,114, all of which applications are assigned to the same assignee as the instant application, there are disclosed other forms of apparatus adapted for the practice of the jet air cooling aspects of the present invention. Thus, one such apparatus, shown in FIGS. 6 to 10 of the instant application and designated by the reference numeral 20a, is designed for use in conjunction with quadruple postinflation equipment 21a (FIG. 6) provided with two dual chuck arrangements.

Figure 6:
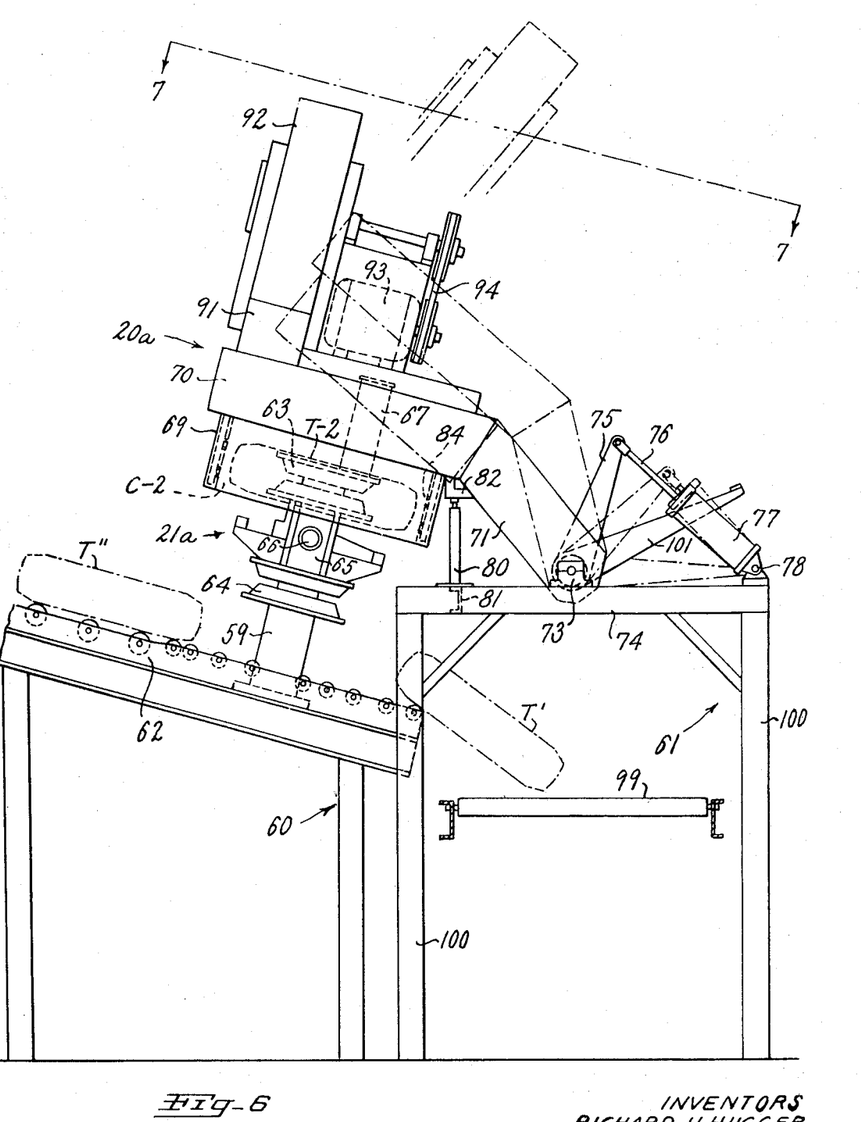
FIG. 6 is a side elevational view of another form of jet air cooling apparatus constructed to implement the process aspects of the present invention and adapted for use in conjunction with a different type of postinflation equipment.

The postinflation equipment 21a per se, which is described and illustrated herein only to the extent of the basic elements thereof with which the jet air cooling apparatus 20a cooperates, in essence includes a column or stand 59 supported by a framework 60 located between the press (not shown) and a framework 61 which supports the apparatus 20a in a manner to be more fully described presently. The stand 59 is arranged midway between two roll conveyors 62, also supported by the framework 60, on which the hot tires taken out of the mold are delivered to the postinflation equipment. Two pairs of radially spaced chucks 63 and 64 are supported in parallel relation by a fulcrum member 65 which in turn is supported by the stand 59 for rotation about a horizontal axis 66. Also secured to and extending upwardly from the stand 59 is double acting pneumatic cylinder 67 which is a part of the chuck-operating mechanism of the postinflation equipment 21a. As to the operation of the latter, it is deemed sufficient to point out that by suitable means, such as a rack and pinion combination (not shown), the fulcrum member 65 can be reciprocally pivoted about the axis 66 so as to dispose either the pair of chucks 63 or the pair of chucks 64 in the upper position.

The jet air cooling apparatus 20a provides two cylindrical cooling chambers C-1 and C-2 (FIGS. 6 and 9) each adapted to receive a respective chuck 63 or 64 (and tire supported thereby) when the pair of such chucks is in the upper position. The chambers C-1 and C-2 are defined within a pair of hollow cylindrical walls 68 and 69 extending downwardly from the bottom of a hollow box structure 70 which is provided with a pair of rearwardly extending arms 71 (FIGS. 6, 7 and 10) fixed at their outer ends to a cross shaft 72 journaled in bearings 73 atop horizontal side members 74 of the framework 61. Also fixedly connected with the cross-shaft 72 are two arms 75 which are articulated to the free ends of respective piston rods 76 extending from a pair of double acting fluid pressure cylinders 77 pivotally mounted at 78 on the rear cross member 79 of the framework 61. Thus, upon actuation of the cylinders 77 to retract the piston rods 76, the box 70 with all parts carried thereby is raised into the broken line position thereof shown in FIG. 6, while upon actuation of the cylinders 77 to protract the piston rods 76, the box 70 is lowered into its solid line position shown in FIG. 6, the rest position in this case being defined by a pair of adjustable jacks or like abutments 80 mounted on the front member 81 of the framework 61 beneath a pair of brackets 82 carried by the arms 71.

Reverting now to the cooling structure of the apparatus 20a, the inner members 68a and 69a of the cooling chamber-defining walls 68 and 69 are provided with respective sets of rows of orifices 83 and 84 corresponding, for example, in size and arrangement to the orifices 39 and 45 of the apparatus 20 shown in FIGS. 1 to 4. The orifices 83 and 84 establish communication between the chambers C-1 and C-2 and the annular interior plenum chambers 85 and 86 of the walls 68 and 69. The plenum chambers 85 and 86 communicate with the interior of the box 70 through respective sets of circularly arranged openings 87 and 88 provided in the bottom wall 70a (FIG. 9) of the box. In the top wall 70b of the box just rearwardly of the front wall 70c thereof is provided a rectangular opening 89 extending laterally and covered by a perforated plate 90. Mounted atop the box 70 over the perforated distribution plate 90 is an inverted funnel-shaped duct 91 which at its narrower upper end is connected to the discharge side of a blower 92 the intake side of which is adapted to draw air from any suitable source as previously explained, e.g., the ambient curing room atmosphere. The blower is mounted in any suitable manner atop the box 70 and is arranged to be driven by means of an electric motor 93 (omitted from FIG. 8 for the sake of clarity) through the intermediary of a drivebelt 94 or other appropriate transmission means. As indicated diagrammatically only in FIG. 8, a safety housing or cover 95 may be provided for the drivebelt.

Figure 7:
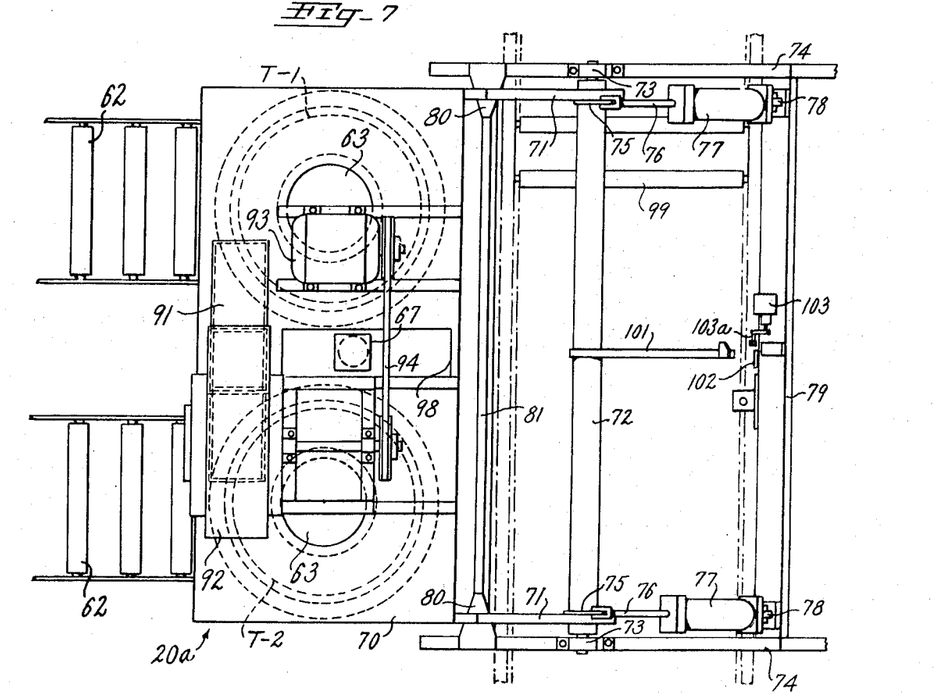
FIG. 7 is a fragmentary plan view of the structure shown in FIG. 6, the view being taken along the line 7—7 of FIG. 6.
Figure 8:
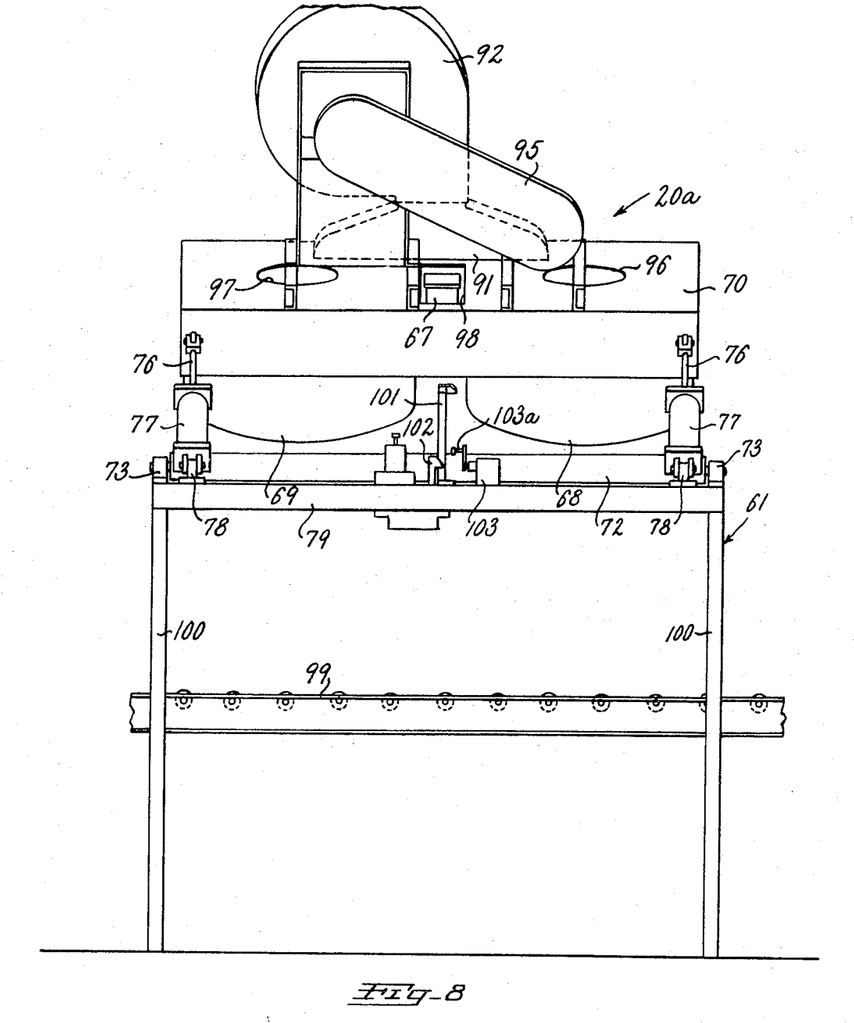
FIG. 8 is a fragmentary rear elevational view of the structure shown in FIG. 6.
Figure 9:
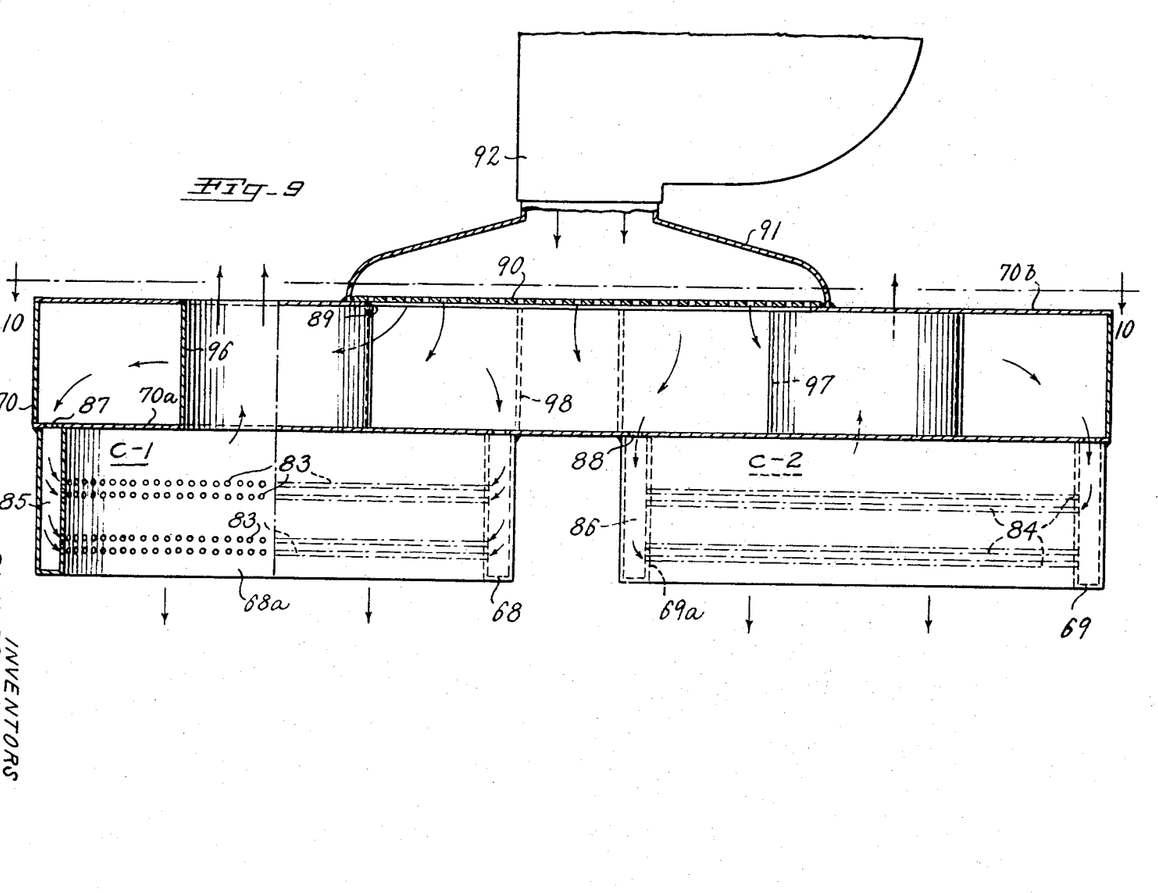
FIG. 9 is a fragmentary vertical section, partly in elevation, through the air distributing means of the jet air cooling apparatus shown in FIG. 6, the view being taken along the line 9—9 in FIG. 10.
Figure 10:
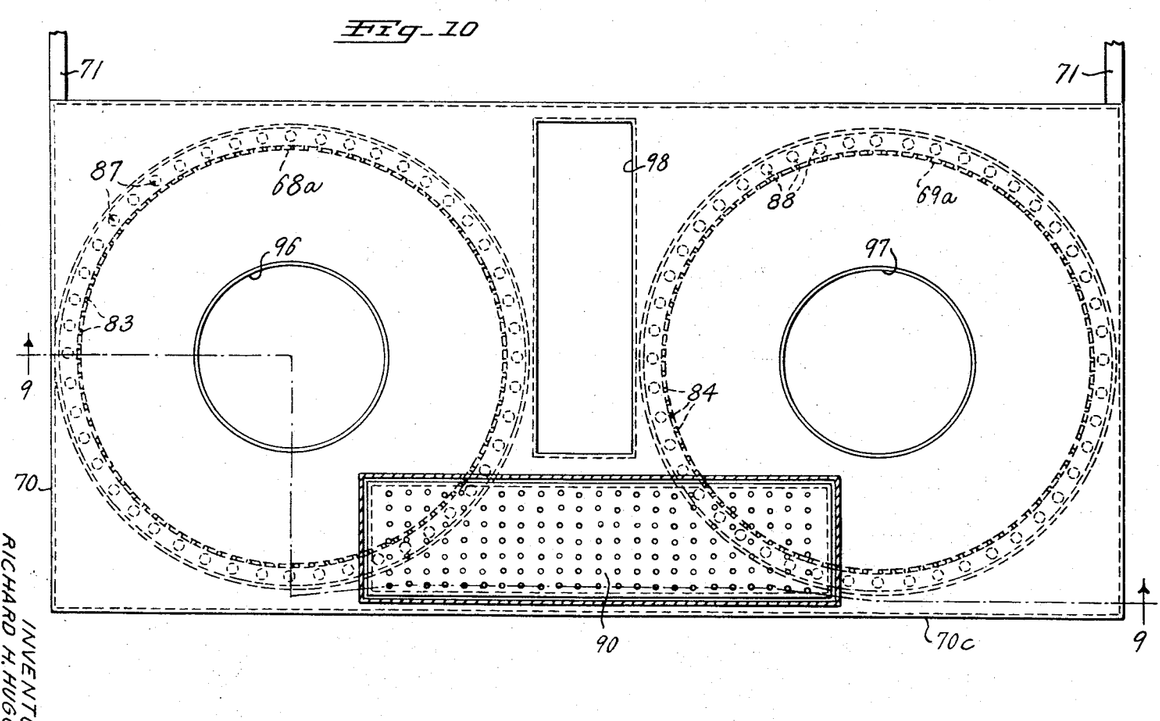
FIG. 10 is a sectional view taken along the line 10—10 in FIG. 9.

Referring further to FIGS. 9 and 10 in particular, the box 70 is traversed from top to bottom by a pair of cylindrical ducts 96 and 97 which are disposed essentially concentrically with the rings of openings 87 and 88 in the bottom wall 70a of the box 70. At their upper ends the ducts 96 and 97 communicate with the atmosphere, and at their lower ends these ducts communicate with the cooling chambers C-1 and C-2. In addition, the box 70 is provided to the rear of the perforated plate 90 and intermediate the rings of openings 87 and 88 with a substantially rectangular passageway 98 which extends from the top to the bottom of the box and, as clearly indicated in FIGS. 6, 7 and 8, is adapted to accommodate the chuck-operating cylinder 67 of the postinflation equipment 21a.

For purposes of a description of the operation of this system, it is assumed as a starting condition that the postinflation treatment of two tires T-1 and T-2 (FIGS. 6 and 7) supported on the upper chucks 63 is in progress. The jet air cooling apparatus 20a thus is in its lowered or solid line position, whereby the tires T-1 and T-2 are disposed within the confines of the cooling chambers C-1 and C-2, respectively. With the blower 92 working, (for example, a 19-inch wheel diameter, radial blade fan running at 1,718 r.p.m.) air at the ambient curing room temperature, say 100° F., passes through the duct 91 at a static pressure of about 5-¼ inches of water, and through the perforated distribution plate 90 into the interior of the box 70 where the pressure is about 4-⅛ inches of water and from which it flows through the respective sets of openings 87 and 88 into the annular plenum chambers 85 and 86, from which in turn under a uniform static pressure of about 3-⅝ inches of water it enters the cooling chambers C01 and C-2 through the respective sets of orifices 83 and 84 at the desired volume flow rate, say about 795 cubic feet per minute. As in the case of the previously described apparatus 20, this air is directed to play principally against the tread in the shoulder regions of the tires T-1 and T-2 and thence over both the crown center region and the sidewalls to effect the desired rapid cooling of the tires, a part of the spent air leaving the cooling chambers C-1 and C-2 through the downwardly open ends thereof, and a part of the spent air leaving said chambers through the upper ends thereof via the cylindrical ducts 96 and 97. The overall airflow pattern is indicated by the arrows in FIG. 9. It is found that in the case of a 7.75×14/2 nylon-44 tire subjected to a dual 300 lb./100 lb. internal pressure steam cure with an external mold temperature of 326° F. in a 13.5 minutes mold cycle, the temperature at the tread-carcass interface in the shoulder regions of a so-called tire is reduced to the range of 150–160° F. in about 13 minutes.

Shortly prior to the termination of the concurrent mold cycle in the press, the tires which were previously subjected to postinflation and cooled on the now lower chucks 64 are deflated and released from the latter to drop onto the downwardly inclined roll conveyors 62, along which they then travel to carry-off conveyor 99 located between the legs 100 of the framework 61, as indicated diagrammatically by the dot-dash line tire T' in FIG. 6. When the press is now opened at the end of the said concurrent mold cycle, the tires then being cured are removed from the press and transferred to the location of the postinflation equipment 21a along the roll conveyors 62, as indicated diagrammatically by the dot-dash line tire T'' in FIG. 6. These tires are picked up and mounted on the chucks 64 in any suitable manner, which need not be explained in detail, whereupon air is admitted thereinto to inflate the tires to the desired pressure.

As soon as this condition has been attained, the cylinders 77 are actuated to retract the piston rods 76, thereby to swing the box 70 and appurtenant parts upwardly into the broken-line position thereof shown in FIG. 6. As the box 70 reaches this position, an arm 101 (FIGS. 7 and 8) carried by the cross-shaft 72 is caught by a latch 102 and at the same time comes into engagement with the actuating lever 103a of a suitable control switch 103, which causes the operating mechanism of the postinflation equipment to be actuated so as to invert the chucks by appropriate movement of the fulcrum member 65 about its axis 66. When this changeover is completed, which may be sensed, for example, by means of a limit switch (not shown) associated with the fulcrum member 65, the latch 102 is released and the cylinders 77 are reversely actuated to protract the piston rods 76, thereby to swing the box 70 and associated parts back down into the solid-line position thereof so as to cause the tires on the now upper chucks 64 to be disposed within the confines of the cooling chambers C-1 and C-2.

The cooling of these tires then proceeds as previously explained for the tires T-1 and T-2, while the latter remain on the now lower chucks 63 until shortly before the termination of the then new concurrent mold cycle in the press, at which time they are deflated and dropped onto the conveyors 62 preparatory to the arrival of the next pair of tires.

It is noted, in passing, that any tires, e.g., the tires T-1 and T-2, which have been subjected to the jet air cooling operation in the chambers C-1 and C-2, will have reached their intended relatively low temperature of about 140–160° F. in only one postinflation cycle, i.e., a period of time somewhat shorter than one full mold cycle. Theoretically, of course, they need not be kept on the now lower chucks for the described longer period of time amounting to almost two full mold cycles, but could be deflated and removed from the chucks substantially immediately after the latter are shifted from the upper or cooling position into the lower or discharge position. In actual practice, however, it is highly recommended that the tires be retained on the lower chucks as described, since this extra cooling period is found to have an appreciably beneficial effect on the road lift of the tires. At the same time, no adverse effects result from the continued open air convection cooling of these tires during this period, since the cure states and the carcass cord shrinkage stresses had already reached such levels during the jet air cooling stage that any changes which might still take place in these conditions are negligible for all practical purposes.

Although in the preferred so far described apparatus forms, the airflow is initially such as to impinge in the first instance substantially radially against selected regions of the tread of the tire being cooled, whereupon the air flows essentially laterally over the tread and ultimately out of the cooling chamber, our objectives can be attained as well by other types of apparatus providing the necessary cooling zone and a controlled airflow, subject to the fundamental requirement that the cooling air deliver a heat transfer coefficient (as herein defined) of the required magnitude.

Figures 11, 12, 13:
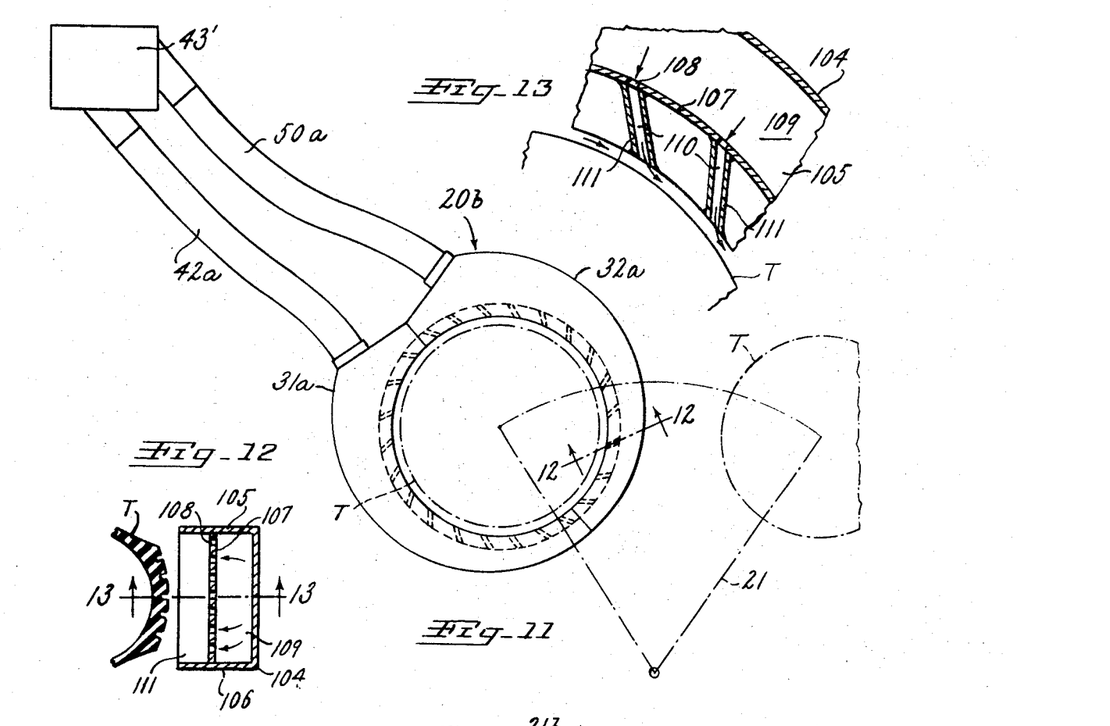
FIG. 11 is a diagrammatic illustration, similar to FIG. 3, of another method of and apparatus for cooling tires during postinflation in accordance with the present invention.
FIG. 12 is a fragmentary sectional view taken along the line 12—12 in FIG. 11.
FIG. 13 is a fragmentary sectional view taken along the line 13—13 in FIG. 12.

Merely by way of example, as diagrammatically shown in FIGS. 11 to 13 in the case of an apparatus 20b (of the class illustrated in FIGS. 1 to 4 designed for cooperation with postinflation equipment 21), the airflow into the cooling chamber defined by the two relatively seperable members 31a and 32a is initially directed obliquely relative to the outer surface of the tread of the tire T then undergoing postinflation, the air as before entering at a plurality of circumferentially spaced locations. The resultant airflow in the cooling chamber thus has a circumferential circulatory component, as indicated by the arrows in FIG. 13, spent air again ultimately escaping laterally of the tire.

Although various ways to achieve this condition are available, the preferred construction we have illustrated comprises, for each of the members 31a and 32a, a channel-shaped arcuate housing 104 which is open at its circularly curved radially inward side and closed at its varyingly curved radially outward side. Welded or otherwise suitably affixed to the inner surfaces of the two side walls 105 and 106 of the housing 104 at a uniform distance from the radially inwardmost edges thereof is a circularly curved plate 107 provided with a plurality of spaced, transverse, parallel rows of openings 108. Each such row of openings establishes communication between the plenum chamber 109, defined at the radially outward side of the plate 107 within the housing 104, and a respective one of a set of flat nozzles 110, each of the latter being defined by a respective pair of spaced plates 111 welded or otherwise suitably secured to the radially inward side of the plate 107 and to the sidewalls 105 and 106 of the housing 104. As before, the cooling air is admitted into the plenum chambers 109 from the blower 43′ via respective ducts 42a and 50a.

The cooling air thus leaves the plenum chambers in the form of a plurality of flat jets. In this type of arrangement, the locus of the discharge ends of the nozzles 110 is symmetrically concentric to the tire being cured and constitutes the effective boundary of the cooling chamber, but it will be understood that this locus need not be cylindrical as shown but could be transversely arcuate, e.g., concave toward the tread of the tire, through appropriate curvature of the discharge end edges of the pairs of nozzle-defining plates 111.

Figure 14:
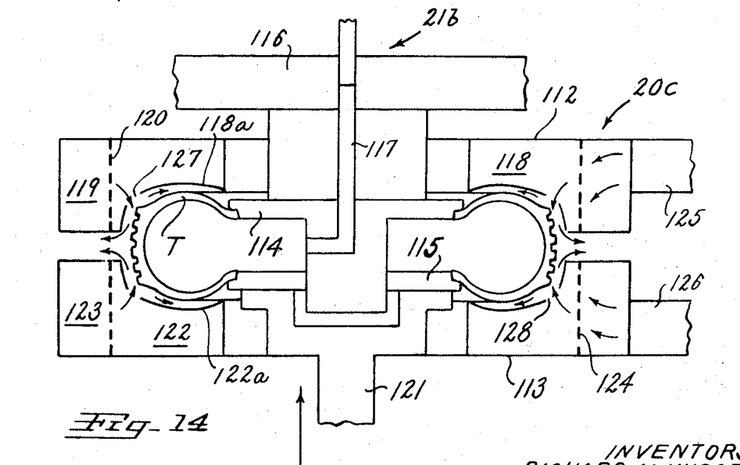
FIG. 14 is a diagrammatic illustration of yet a further method of and apparatus for cooling postinflated tires in accordance with the present invention.

Alternatively, as diagrammatically shown in FIG. 14 in the case of a jet air cooling apparatus 20c designed for cooperation with postinflation equipment 21b, the airflow into the cooling chamber defined between two axially relatively separable members 112 and 113 of the apparatus 20c is initially directed countercurrently against the tire under postinflation from the opposite sides of the tread thereof. The main part of the cooling air from each such member thus flows over the tread toward the crown center of the same, ultimately escaping radially of the tire, while a minor part of the cooling air from each member flows over the respective sidewall, ultimately escaping at the bead region of the tire.

Again, various ways of achieving this condition are available. The preferred construction we have illustrated makes use of postinflation equipment having a stationary chuck structure 114 and a relatively movable chuck structure 115. The support 116 for the stationary chuck structure, which accommodates the air conduit means 117 for inflating the tire T to be cooled, also carries the member 112 of the jet air cooling apparatus 20c. The member 112 is in the shape of an annular housing defining an inner plenum chamber 118 and a surrounding distribution chamber or zone 119 separated by a perforated distribution plate 120. Similarly, the reciprocally displaceable support 121 for the movable chuck structure 115 also carries the member 113 which is substantially identical in shape with member 112 and defines an inner plenum chamber 122 and an outer distribution chamber or zone 123 separated by a perforated distribution plate 124. Cooling air is admitted into the two zones or chambers 119 and 123 via preferably flexible ducts 125 and 126 connected to the discharge side of a suitable blower (not shown) or other air source, and preferably annular orifices 127 and 128 are provided at the appropriate locations in the respective mated walls 118a and 122a of the members 112 and 113, which define the boundary of the cooling chamber, to enable the cooling air to enter the latter from the plenum chambers 118 and 122 in the form of a pair of annular jets.

It will be apparent, of course, that still other airflow patterns and conditions as well as other air jet configurations and orientations which achieve the desired cooling rates and uniformity of tire characteristics, could be devised and utilized in lieu of those so far described, for example incorporation of circumferential airflow in the apparatus of FIGS. 6 to 10.

The jet air cooling of tires while under postinflation in accordance with the principles of the present invention, independently of the nature of the airflow utilized, in addition of providing uniform cooling and appreciably shortening the required postinflation cycles, leads to another extremely important advantage in the manufacture of tires, to wit it makes possible a concomitant shortening of the mold cycles in such a manner that the feasibility of producing optimally cured tires remains unimpaired despite the shortened overall cure cycles and the consequent increased production rate. In general, this result is achieved by utilizing the external mold temperatures in the press to heat the tires during the mold cycles to such an extent as to ensure attainment of a predetermined state of cure of the rubber, at all points generally in excess of 50 percent but less than 100 percent of the total cure state desired to be achieved during the total cure cycle, before the postinflation cycle begins. The significance of this procedure and its relationship to the subsequent jet air cooling operation during the postinflation cycle will be clearly understood from the following, reference in this connection being had to FIG. 15 of the drawings.

Figure 15:
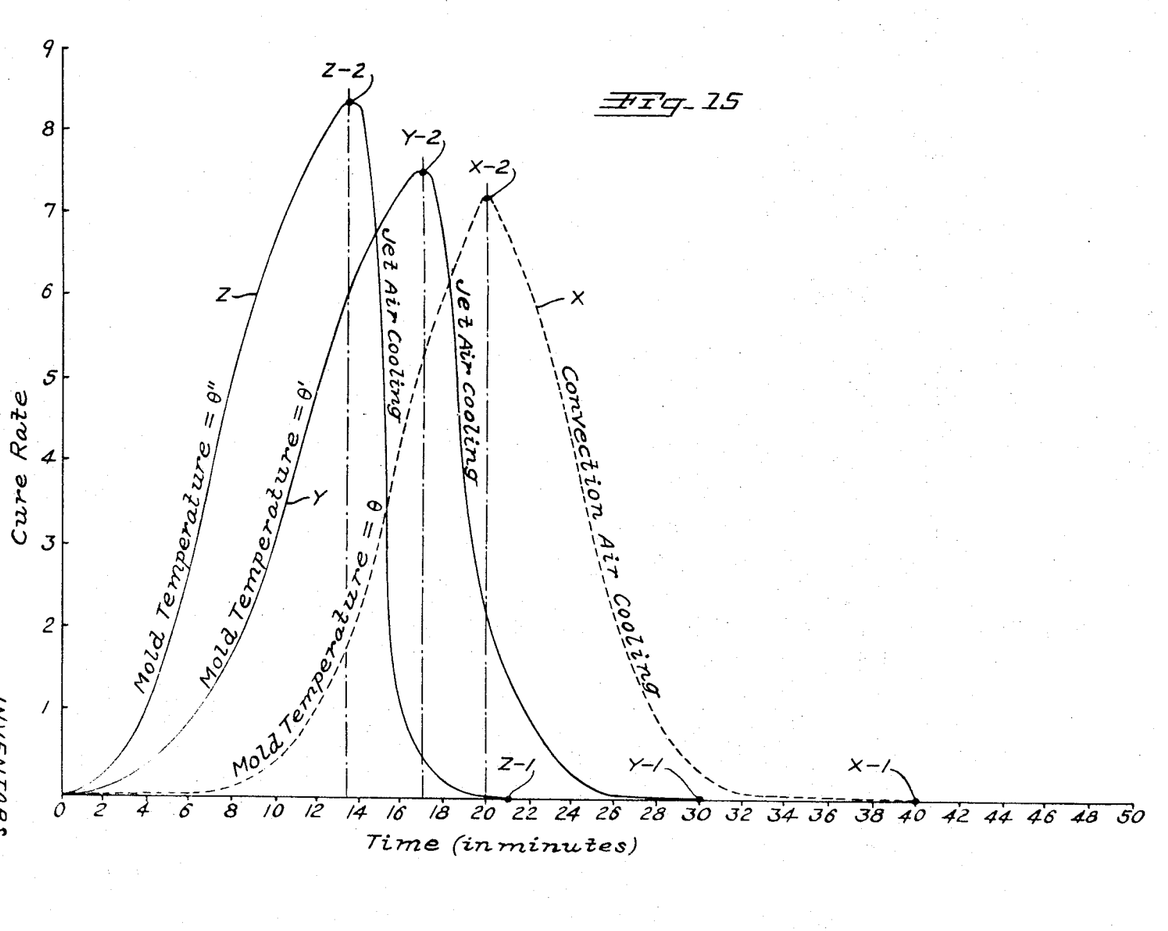
FIG. 15 is a graphic representation of the advantageous results achieved by the implementation of the tire production improvements of the present invention.

In FIG. 15 the curves X, Y and Z graphically represent three plots of cure rate against time (the reference points are at the center of the shoulder section of the tread, approximately midway between the outer tread surface and the band ply, but the same considerations would apply for any other reference point) for three identical tires subjected during otherwise identical curing operations to three different external mold temperatures $\theta$, $\theta'$ and $\theta''$. By virtue of the nature of the plot, therefore, the area under each curve represents the total cure state reached by the respective tire, expressed in arbitrary cure units which need not be uniquely defined for the purpose of the present discussion. (In one segment of the tire industry, for example, 1 cure unit is defined as the state of cure achieved by the rubber material in the period of one minute at an arbitrarily selected reference temperature.) It is to be assumed, however, that at the three end points X-1, Y-1 and Z-1, representing the times when the postinflation operation is terminated, the three tires all have identical cure states of 72 units, i.e., the areas under the respective curves are equal.

Referring now first to the curve X, the same represents a standard curing and postcure inflation cooling operation. Starting at time 0, the cure of the tire proceeds with a conventional external mold temperature, $\theta$, continuing to the point X-2 which is reached after about 20 minutes and corresponds to the release of pressure in the bladder of the press (usually less than ½ minute before the press is opened). At that time, the cure of the tire has progressed about halfway to its intended end point, the area below the curve X to the left of the vertical line passing through the point X-2 being equal to 35.5 cure units, i.e., a shade less than one-half of the desired final cure.

The tire is then mounted and inflated on the postinflation equipment and permitted to cool by open air natural convection, which proceeds at a relatively low rate for a further period of about 20 minutes until at point X-1 the tire has reached the desired cure state of 72 cure units. It will be understood that the reason for the curve X flattening out as it approaches point X-1 is that over the last several minutes of the cooling period, the cure rate drops almost to zero since the tire is already at a relatively low temperature, say in the neighborhood of about 200° F. In any event, it is readily apparent that under this method a substantial part (actually more than 50 percent) of the desired cure state of the tire in achieved after the pressure is released in the bladder and the tire taken out of the mold, and since, as previously point out, open air natural convection cooling in a tire curing room cannot possible be uniform around the circumference of the tire, the exact state of cure at all points of the tire is not properly controlled. The result is a tire which is more likely than not characterized by excessive dimensional instability, i.e., circumferential nonuniformity of radial dimension, as well as by circumferentially nonuniform cure states and, in the case of a tire reinforced by a carcass of heat-shrinkable fiber tire cords, also by circumferentially nonuniform cord stress conditions.

This deficiency in the known tire manufacturing operation is effectively eliminated by our invention, since by virtue of the markedly superior efficiency of our jet air cooling process we are now able to precede the postinflation cycle with a mold cycle in which the rubber portions of the tire are raised to a much higher than usual temperature. As a result, we are able to ensure that a major portion, generally within the range mentioned above and preferably on the order of about 65 to 75 percent, of the desired cure state is achieved in a shorter time in the mold under the precisely controlled conditions existing therein, and that the remaining minor portion of the desired cure state achieved out of the mold is also brought about in a shorter time as well as under precisely controlled conditions so as to be circumferentially uniform at any given radial dimension of the tire.

These advantages of our invention are clearly illustrated by the curves Y and Z in FIG. 15, the former representing a tire cure utilizing an external mold temperature $\theta'$ somewhat higher than the conventional mold temperature $\theta$ and followed by jet air cooling of the tire during postinflation, and the latter representing a tire cure utilizing an even higher external mold temperature $\theta''$ followed by an appropriately higher rate of jet air cooling. Thus, the temperatures $\theta'$ and $\theta''$ are such that after periods of only about 17 and 13.5 minutes the areas under the curves Y and Z to the left of the vertical lines passing through the points Y-2 and Z-2 are equal to 48.5 and 51 cure units, respectively, clearly major proportions of the desired cure states of 72 units. Accordingly, the states of cure at the start of the subsequent jet air cooling operations are such that the desired cure states of 72 units are reached, and the postinflation cycles can be terminated, at points Y-1 and Z-1 after only 13 and 7-½ minutes, respectively, following the release of pressure in the bladder.

It will be readily apparent, therefore, that the implementation of our invention as aforesaid is not only conductive to the production of more tires which are characterized by circumferentially substantially uniform thermal, physical and geometrical properties to a high degree, but also enables both the mold and postinflation cycles, and thus the overall curing cycles, to be substantially shortened, whereby the achievement of major economics in tire manufacture becomes a realizable goal.

In the preceding discussion, the indicated cure state is taken to be that at the thickest parts of the tire, which generally means the tread in the shoulder regions of the tire. The implementation of the present invention, however, automatically results in the achievement of optimum cure states at other, thinner parts of the tires as well, since the jet air cooling conditions would normally have been first properly predetermined, adjusted and optimized, with due consideration given to such factors as air temperature and velocity, orifice size and distribution and arrangement, tire size and type and temperature, duration of the mold and postinflation cycles, and others not necessary to reiterate and itemize in detail at this point, to take the thickness variations into account, i.e., to ensure that even though a thinner part would have been cured to a greater extent during the mold cycle than a thicker part, the airflow distribution and the changes in the temperature of the air as it flows across the thick and thin parts are such that at the end of the postinflation cycle the thin parts reach their optimum state of cure at substantially the same time as the thick parts.

It is to be understood that the foregoing description of preferred apparatus and process aspects of the present invention is for purposes of illustration only, and that the structural and operational features, characteristics and relationships disclosed herein may be changed and modified in a number of ways, as, for example, by the substitution of dual units for single units and vise versa, none of which entails a departure from the spirit and scope of the present invention as defined in the hereto appended claims.

Having thus described our invention, what we claim and desire to secure by Letters Patent is as follows:

1. Apparatus for postmold cycle cooling a pneumatic tire, after the removal of the tire from the mold and during the course of a postinflation treatment, by means of a mass of cooling air moving under flow conditions sufficient, at the temperature of said cooling air, to achieve over the surface of the tire a tire to air heat transfer coefficient ranging from about 15 to about 70 B.t.u./hr./sq. ft./° F. and to ensure that the ultimate cooled tire is characterized by an optimum set of circumferentially substantially uniform thermal, physical and geometrical properties, comprising:
   a. means defining a cooling zone within the confines of which the tire to be cooled may be axially received;
   b. said means defining said cooling zone including wall means
      1. encircling and constituting the peripheral boundary of said cooling zone and
      2. arranged in juxtaposition to the mounting location of a postinflation chuck on which the tire is mounted while undergoing said postinflation treatment;
   c. means providing a flow of cooling air against and over the entire surface of said wall means facing away from said cooling zone; and
   d. orifice means provided in said wall means coextensively with said peripheral boundary of said cooling zone and establishing airflow paths into said cooling zone from the surrounding region contiguous to said surface of said wall means;
   e. said orifice means being positioned for directing said cooling air
      1. in jet form into said cooling zone 2. simultaneously along the entire peripheral boundary thereof and
3. so as to be incident initially against the tread of the postinflated tire being cooled, in at least the shoulder regions of the tread, simultaneously along the entire circumference of the tire when the same is received within said cooling zone;

f. said orifice means being constructed and arranged to provide a percentage of open area in said wall means coordinated with the operational characteristics of said airflow providing means to ensure the existence of said sufficient flow conditions in said cooling zone.

2. Apparatus according to claim 1, said orifice means comprising a plurality of orifices having a locus which in said cooling zone lies between about ½ and 5 inches from the exterior surface of the tread of any size tire to be cooled when the same is received in said cooling zone.

3. Apparatus according to claim 2, said orifices being arranged in two pairs of parallel rows located opposite the respective locations of the tread of the tire in the shoulder regions thereof when the same is received within said cooling zone.

4. Apparatus according to claim 3, said orifices being of circular configuration and each being between about ⅛ and ⅜-inch in diameter, and the centers of directly adjacent orifices in each pair of rows being between about ½ and 1 inch apart.

5. Apparatus according to claim 1, said means defining said cooling zone comprising a pair of arcuate wall sections the concave front faces of which are directed toward each other, said wall sections being arranged for relative approaching and separating motion and when in closed end to end juxtaposition constituting the peripheral boundary of said cooling zone, and said orifice means being provided as adjuncts of said wall sections.

6. Apparatus according to claim 5, each of said wall sections constituting a part of a respective hollow body which defines a respective half of an air distribution zone coextensive with the convex rear face of the respective wall section and in communication with said orifice means, and each of said hollow bodies being provided with an inlet opening for admitting cooling air into said distribution zone.

7. Apparatus according to claim 6, further comprising blower means the discharge side of which is in communication with each half of said distribution zone via said inlet opening, and the intake side of which is open to the curing room temperature.

8. Apparatus according to claim 6, further comprising blower means the discharge side of which is in communication with each half of said distribution zone via said inlet opening, and the intake side of which is open to the atmosphere outside the curing room.

9. Apparatus according to claim 6, further comprising blower means the discharge side of which is in communication with each half of said distribution zone via said inlet opening, and the intake side of which is in communication with a source of cooling air at a temperature below about 120° F.

10. Apparatus according to claim 6, each of said hollow bodies comprising an internal wall structure dividing the respective half distribution zone defined within that body into a plenum chamber located to one side of said internal wall structure and coextensively contiguous to both the associated wall section and said internal wall structure, and into a distribution chamber located to the other side of said internal wall structure and coextensively contiguous to the latter, each of said internal wall structures being provided with a respective plurality of apertures establishing communication between the associated distribution and plenum chambers, and each of said inlet openings being in communication with the associated distribution chamber.

11. Apparatus according to claim 6, said wall sections being semicylindrical in shape.

12. Apparatus according to claim 11, said orifice means comprising at least one row of orifices in each of wall sections, each row in each wall section being aligned with a corresponding row in the other wall section.

13. Apparatus according to claim 12, said wall sections being bounded at their respective opposite sides by corresponding pairs of radially inwardly and axially outwardly oriented lateral wall portions.

14. Apparatus according to claim 13, each of said lateral wall portions being provided with at least one row of orifices, and each row in each lateral wall portion of each wall section being aligned with a corresponding row in the corresponding lateral wall portion of the other wall section.

15. Apparatus according to claim 5, said orifice means comprising a plurality of flat nozzles extending at uniform spacing codirectionally obliquely inwardly relative to the concave front faces of said wall sections and being oriented codirectionally nonradially of the tread of the tire being cooled when the same is received in said cooling zone.

16. Apparatus according to claim 5, said orifice means comprising a pair of annular openings arranged in the laterally outwardmost regions of said wall sections so as to be located adjacent the shoulders of the tire being cooled when the same is received in said cooling zone.

17. Apparatus according to claim 5, said orifice means comprising a plurality of orifices in said wall sections sufficient to provide between about 1¼, and 15 percent open area in the total area of said wall sections.

* * * * *

PO-1050
(5/69)

UNITED STATES PATENT OFFICE
CERTIFICATE OF CORRECTION

Patent No. 3,645,660      Dated February 29, 1972

Inventor(s) Richard H. Hugger and George C. Huang

It is certified that error appears in the above-identified patent and that said Letters Patent are hereby corrected as shown below:

Column 1, line 74, for "by" read --to--. Column 6, line 28, for "at" (second occurrence) read --in--. Column 10, line 17, for "CO1" read --C-1--. Column 10, line 34, for "so-called" read --so-cooled--. Column 13, line 35, for "in" read --is--. Column 13, line 37, for "point" read --pointed--. Column 13, line 39, for "possible" read --possibly--. Column 14, line 7, for "conductive" read --conducive--. Column 14, line 13, for "economics" read --economies--. Column 15, lines 45/46, for "temperature" read --atmosphere--. Column 16, line 23, for "of wall sections" read --of said wall sections--.

Signed and sealed this 9th day of January 1973.

(SEAL)
Attest:

EDWARD M. FLETCHER, JR.
Attesting Officer

ROBERT GOTTSCHALK
Commissioner of Patents